US007603450B2

(12) United States Patent
Lutz (10) Patent No.: US 7,603,450 B2
(45) Date of Patent: Oct. 13, 2009

(54) METHODS AND APPLETS FOR PROVIDING AND CONTRIBUTING TO AN IT NETWORK MANAGEMENT SERVICE

(75) Inventor: Manfred Lutz, Gäufelden (DE)

(73) Assignee: Hewlett-Packard Development Company, L.P., Houston, TX (US)

( * ) Notice: Subject to any disclaimer, the term of this patent is extended or adjusted under 35 U.S.C. 154(b) by 1409 days.

(21) Appl. No.: 10/132,418

(22) Filed: Apr. 26, 2002

(65) Prior Publication Data

US 2003/0204579 A1 Oct. 30, 2003

(51) Int. Cl.
*G06F 13/00* (2006.01)
(52) U.S. Cl. ...................................... 709/223
(58) Field of Classification Search ................ 709/223
See application file for complete search history.

(56) References Cited

U.S. PATENT DOCUMENTS

| | | | | |
|---|---|---|---|---|
| 6,363,421 | B2 * | 3/2002 | Barker et al. ................. | 709/223 |
| 6,529,938 | B1 * | 3/2003 | Cochran et al. .............. | 709/203 |
| 6,785,734 | B1 * | 8/2004 | Blasiak et al. ............... | 709/238 |
| 6,920,492 | B2 * | 7/2005 | Richard ....................... | 709/220 |
| 6,944,183 | B1 * | 9/2005 | Iyer et al. .................... | 370/466 |

OTHER PUBLICATIONS

W. Richard Stevens, TCP/IP Illustrated, vol. 1, The Protocols, 1994, pp. 1-2, 359-418, 483, English.
W. Richard Stevens, TCP/IP Illustrated, vol. 3, TCP for Transactions, HTTP, NNTP, and the UNIX Domain Protocols, 1996, pp. 161 to 176, English.
http://www.dmtf.org/spec/dmis.html; Dec. 19, 2000, English.
http://www.dmtf.org/wbem/index.html; Dec.19, 2000, English.
http://www.w3.org/tr/rec-xml-1998021; Mar. 9, 2001, English.
http://www.motive.com/company/press_releases/news_press_verizon.html; Jan. 29, 2002, English.
Support for eBusiness Support.com 10 Rules of eSupport, White Paper-1001 Nov. 2000, English.
C. Horstmann, Computing Concepts with JAVA 2 Essentials, second edition, 1998, pp. 139 to 142, English.
http://www.w3.org/XML/Schema.htm; Apr. 22, 2002, English.

* cited by examiner

*Primary Examiner*—Robert B Harrell

(57) ABSTRACT

The invention is directed to methods for providing a network management service for a user's IT network by a network management service provider over the Internet. One of these methods comprises: sending mobile code to the user via the Internet, said mobile code, when running at the user's side, acts as a network management gateway between the user's network and the service provider connectable to it via the Internet; sending at least one request for the execution of a network management step to the network management gateway at the user's side via the Internet, whereupon the network management step is carried out in the user's network; receiving result data obtained in the network management step from the network management gateway via the Internet. The invention is also directed to corresponding methods for contributing to a network management service and to applets which are loaded in the user's browser for carrying out these contributing methods.

40 Claims, 8 Drawing Sheets

FIG.5

```
File  View  Help
Start Time: Mon Oct.29 12:43:54 CET 2001        Duration: 24s
Request Nr. 1                        100%
```

Command Log

| Command | Output |
|---|---|
| sh version | Cisco Internetwork Operating system Software<br>IOS (tm) 2500 Software (C2500-D-L,Version 11.2(4)P, SHARED PLATFORM, RELEASE SOFTWARE (fc1)<br>Copyright (c) 1986-1997 by cisco System, Inc.<br>Compiled Tue 11-Feb-97 16:47 by tamp<br>Image text-base: 0x0302AAA0, data-base: 0x00001000<br><br>ROM: System Bootstrap, Version 4.4 (1089) [cshen104J], INTERIM SOFTWARE<br>ROM: 3000 Bootstrap Software (IGS-HPBOOT-R), Experimental Version 11.0 (9885) [cshen 108]<br><br>NSL_HPInternetRouter 1 uptime is 10 weeks, 3 hours, 7 minutes<br>System restarted by reload<br>System Image file is "flash: c2500-d-1.112.-4.P", booted via flash<br><br>HP J3138A Router (68030) processor (revision L) with 6144K/2048K bytes of memory<br>Processor board ID 05763533, with hardware revision 00000000<br>Bridging software.<br>X.25 software, Version 2.0,NET2, BFE and GOSIP compliant.<br>Basic Rate ISDN software, Version 1.0.<br>1 Ethernet/IEEE 802.3 Interface(s)<br>2 Serial network Interface(s)<br>1 ISDN Basic Rate Interface(s)<br>32K bytes of non-volatile configuration memory.<br>8192K bytes of processor board System flash (Read ONLY)<br><br>Configuration register is 0x2102 |

[Filter Output]    [View Results]    [ExR]

Examining host ns 1201...

METHODS AND APPLETS FOR PROVIDING AND CONTRIBUTING TO AN IT NETWORK MANAGEMENT SERVICE

FIELD OF THE INVENTION

The present invention relates generally to the management of information technological (IT) networks, and more particularly, to methods for providing an IT network management service over the Internet as well as methods and applets contributing to such a service.

BACKGROUND OF THE INVENTION

Nowadays, as information systems become ubiquitous and companies and organizations of all sectors become more and more dependent on their computing resources, the requirement for the availability of the hardware and software components of an IT network, and of services based on such a network, is increasing while the complexity of IT networks is growing. An IT network often comprises a diversity of systems, such as routers, hosts, servers, with operating systems, middleware and applications. The management of all these systems becomes important, not only for large organizations, but also for medium-sized and small ones.

Network management of a TCP/IP network comprises network management stations ("managers") communicating with network elements. The network elements can be anything that runs the TCP/IP protocol suite: Routers, hosts, servers, etc. (As to the meaning of the "TCP/IP protocol suite", see e.g. W. Richard Stevens: TCP/IP Illustrated, Volume 1, The Protocols, 1994, pages 1 to 2). A protocol for the communication between the manager and the elements is the Simple Network Management Protocol (SNMP), which is part of the TCP/IP protocol suite. Since most of the SNMP messages are simple request-reply protocols (the manager sends a request, the element sends back a reply), SNMP mostly uses UDP, which is part of the TCP/IP protocol suite, rather than TCP. SNMP enables two-way communication: A manager can ask an element for a specific value, or the element can tell the manager that something happened. Also, the manager is able to set variables in the element, in addition to reading variables from it. A description of SNMP can, for example, be found in Stevens, Vol. 1, pages 359 to 388.

Another standard which was developed for remote login, but can also be used more generally for network management is Telnet (see e.g. Stevens, Vol. 1, pages 389 to 418).

Another standard for network management is what is called the "Desktop Management Interface" (DMI). It has been defined by the Distributed Management Task Force (DMTF). DMI is a standard framework for managing and tracking components in a desktop personal computer, notebook or server.

An emerging standard for the management of operating systems and applications is the Web-Based Enterprise Management (WBEM). WBEM is a set of management tools using emerging technologies such as CIM and XML. In particular, WBEM is a set of the following technologies: "CIM Schema v 2.2", "CIM Operations over http", and "XML encodings for CIM". CIM stands for Common Information Model and is a data model for describing information for the management of enterprise computing environments. XML stands for Extensible Mark up Language and is a standard which can be used for exchanging messages between different applications.

The Internet is a global public TCP/IP network. Non-public IT networks—also called intranets—are often constructed on the basis of the same internet technologies. Usually, the intranet is connected to the Internet in a way that does not compromise internal proprietary information by a firewall gateway. The firewall gateway creates a protected enclave by enforcing restrictions on Internet citizens' access to the intranet. A firewall gateway is a router between the intranet and the Internet that filters out (discards) certain IP datagrams, for example, such incoming datagrams which cannot be identified as web responses to web requests sent out from the intranet (see Stevens, Vol. 1, page 483). "Web" stands for the "World Wide Web" which, in turn, means the Internet with the HTTP protocol (or HTTPS) (see e.g. W. Richard Stevens: TCP/IP Illustrated, Volume 3, TCP for Transactions, HTTP, NNTP, and the UNIX Domain Protocols, 1996, pages 161 to 176).

There are network management systems available which enable the availability and performance of objects within an intranet to be managed. For example, HEWLETT-PACKARD offers such a product family under the name "HP OPENVIEW". A corresponding network-management software package has to be installed on a management server within the intranet to be managed and has to be adapted and configured to the structure of the particular intranet. The necessity to install the management software package within the intranet is due to the fact that the firewall is usually set up to discard incoming non-requested IP datagrams with SNMP messages. A remote login in the management server is possible, for example via an ISDN connection.

Online support services for desktop computers across the Internet boundary are offered by support service providers, such as Support.com, Inc. and Motive Communications, Inc. A customer has to install and run a special computer program on his desktop computer in order to get the support. The communication with the support provider is carried out via the Internet using HTTP. These known systems for desktop computer support do not enable a management of networks.

SUMMARY OF THE INVENTION

The invention is directed to a method for providing a network management service for a user's network by a network management service provider over the Internet. The method comprises: sending mobile code to the user via the Internet, said mobile code, when running at the user's side, acts as a network management gateway between the user's network and the service provider connectable to the user's network via the Internet; sending at least one request for the execution of a network management step to the network management gateway at the user's side via the Internet, whereupon the network management step is carried out in the user's network; receiving result data obtained in the network management step from the network management gateway via the Internet.

According to another aspect, the invention provides a method for contributing to a network management service for a user's IT network at a user's site. The management service is provided by a network management service provider over the Internet. The method comprises: receiving mobile code via the Internet, said mobile code, when running at the user's side, acts as a network management gateway between the user's network and the service provider connectable to the user's network via the Internet; receiving at least one request for a network management step from the service provider via the Internet and executing the request by the network management gateway; returning result data obtained in the network management step to the service provider via the Internet.

According to a further aspect, the invention provides an applet including program code. The object of the program code is, when executing in a user's Internet browser, to act as a network management gateway between a user's network and a network management service provider. When the applet receives a request for a network management step from the service provider via the Internet, it executes the request in the user's network and returns result data obtained in the execution of the network management step to the service provider via the Internet.

According to a further aspect, the invention is directed to a method for providing a network management service for a user's IT network by a network management service provider over the Internet. The method comprises: sending at least one network management command in an encapsulated form to the user's side over the Internet for decapsulation into a network-management-protocol command at the user's side and execution in the user's IT network; receiving result data obtained by executing the network-management-protocol command over the Internet.

According to still another aspect, the invention provides a method for contributing to a network management service for a user's IT network at a user's site. The management service is provided by a network management service provider over the Internet. The method comprises: receiving at least one network management command in an encapsulated form from the service provider over the Internet; decapsulating the command and thereby obtaining a corresponding network-management-protocol command; executing the network-management-protocol command in the user's IT network; returning result data obtained by executing the network-management-protocol command to the service provider over the Internet.

Finally, the invention is directed to an applet including program code. The applet is, when executed in a user's Internet browser, for carrying out a method for contributing to a network management service for a user's IT network. The management service is provided by a network management service provider over the Internet. The method comprises: receiving at least one network management command in an encapsulated form from the service provider over the Internet; decapsulating the network management command received in an encapsulated form from the service provider over the Internet and thereby obtaining a corresponding network-management-protocol command; executing the network-management-protocol command in the user's IT network; initiating the return of result data obtained by executing the network-management-protocol command to the service provider over the Internet.

Other features are inherent in the methods and applets disclosed or will become apparent to those skilled in the art from the following detailed description of embodiments and its accompanying drawings.

DESCRIPTION OF THE PREFERRED EMBODIMENTS

Figure 1:
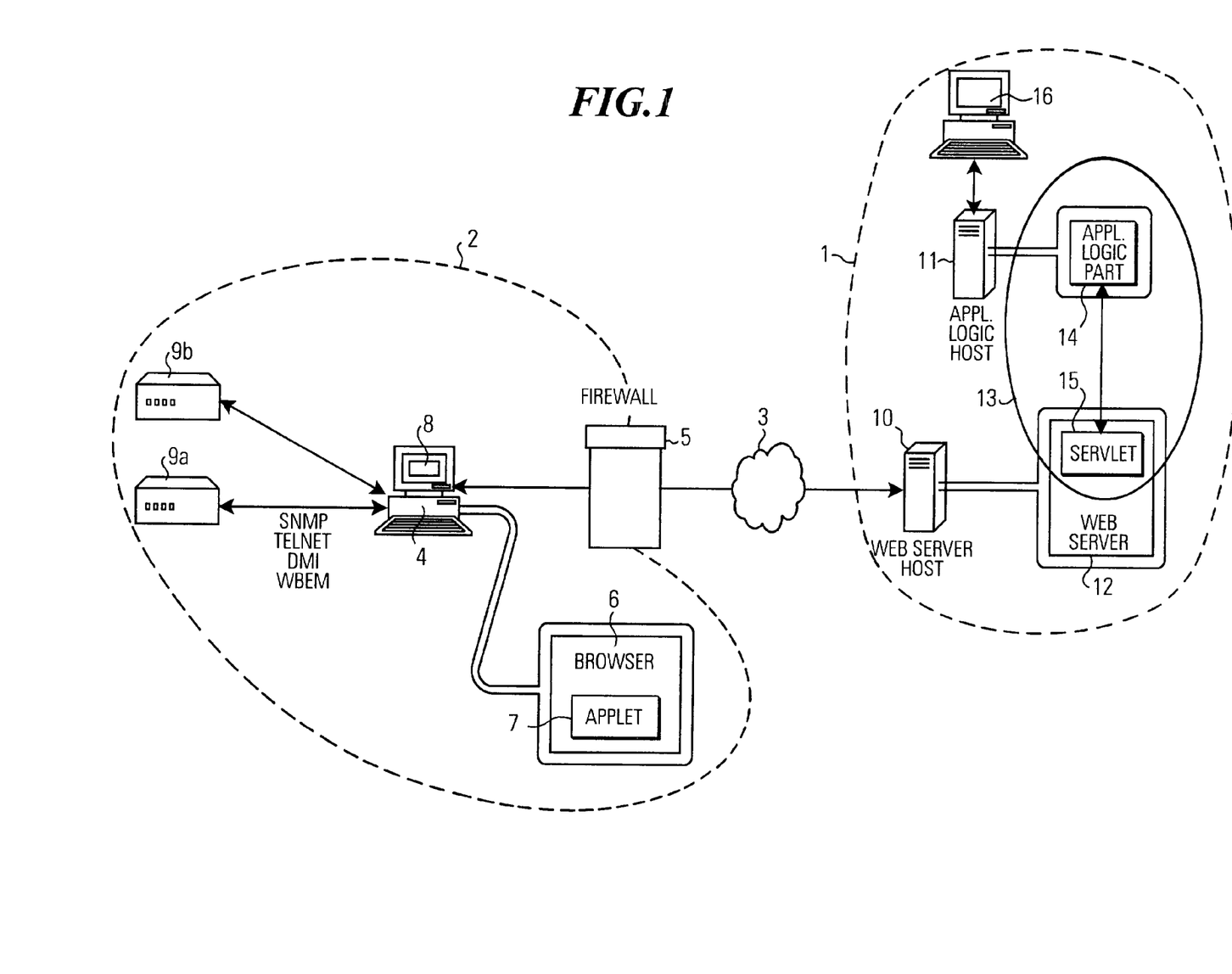
FIG. 1 shows a high-level architecture diagram of a system for providing a network management service over the Internet, including a user's IT network to be managed.

FIG. 1 shows a high-level architecture diagram of a preferred embodiment of a system for providing a network management service, including a user's IT network to be managed. Before proceeding further with the description, however, a few items of the preferred embodiments will be discussed.

In order to make the following description of preferred embodiments more comprehensible, systems and methods for providing a network management service over the Internet are described in an "integrated" view, i.e. in a manner which includes both the equipment and method steps of the service provider's side and the user's side, including the Internet between them. However, usually, but not necessarily, the service provider and the user will belong to different organizations situated at distinct locations, so that it is appropriate to claim systems and methods separately as they appear in the service provider's perspective, or, alternatively, the user perspective. Furthermore, in at least some of the preferred embodiments, mobile code in the form of an applet is sent to the user by traveling signals over the Internet. Such an applet can be considered as a separable product which incorporates a gateway functionality between the user's network and the service provider. Thus, it is appropriate to direct separate claims to an applet.

The user's IT network to be managed is usually, but not necessarily, a non-public computer network (intranet), but it may also be a telecommunication network. The IT network may comprise network elements, such as routers, hosts, servers, workstations, desktop computers, peripheral devices such as printers and scanners, and operating systems, middleware and applications running on these devices. All these items can be network elements to be managed.

The "management" of a network or network elements comprises a variety of tasks, such as diagnosis tasks, status detection, configuration checks, software version checks, error correcting or fixing tasks, setting tasks, and network-element-recognition tasks. Software update tasks may also be included provided that the required software updates are available in or transferred to the user's network.

In order to be accessible by the service provider, the user's network elements have to be actuated for network management, for example they have to be reachable by SNMP, Telnet or DMI.

In the preferred embodiments, the network to be managed (which is preferably a TCP/IP network) is connected to the Internet. Networks or part of networks which have no access to the Internet require conventional internal management architectures in which the management server is located within the (isolated) intranet.

The term "mobile code" does not mean that the code actually moves while it is executing. Rather, the code is replicated, communicated to the user in the form of traveling signals over the Internet, and then executed there. An obstacle to the idea of mobile code is the differing representations and the interfaces between a program and the infrastructure across computing platforms. This obstacle is addressed by the Java technology in the form of Java programs called applets. Applets are programs that run inside a web browser. The code for an applet is stored on a web server and downloaded into the browser whenever a web page that contains the applet is accessed (see, for example, C. Horstmann, Computing Concepts with JAVA 2 Essentials, second edition, 1998, pages 139 to 142). Alternatively, but less preferred, it is also possible to keep the applet at the user's site after its first use and to reload the stored code rather than transmitting it each time the user sends a corresponding request. In alternative embodiments, the service provider's web page can enable the user to either download the applet from the service provider and execute it, or, when the required applet is already stored at the user's side, to cause the stored applet to be executed in the user's web browser. Web browser programs with Java applets are able to execute on multiple platforms, such as on PCs, MACINTOSHES, UNIX workstations, and special web devices. Although the term "applet" was created in the context of the JAVA programming language, it is herein not used in the limited meaning of a JAVA applet, but rather stands for any mobile code embedded in or referenced by a web page, such that the mobile code is executed in the web browser when the web page is downloaded. For example, the C# programming language by MICROSOFT also provides such an applet functionality. In the future, there may be further suitable programming languages which enable the definition of applets.

Usually a firewall gateway is arranged between an intranet and the Internet, and the firewall filters out (i.e. discards) incoming IP datagrams which cannot be assigned to a previous HTTP request originating from within the intranet. Accordingly, the firewall would filter out SNMP or Telnet commands coming from outside.

Conventionally, network management is carried out by use of a network management station which is located within the intranet and communicates with the network elements with a network-management-protocol supported by the network and the network elements, such as SNMP or Telnet in a TCP/IP intranet.

In contrast, in the disclosed embodiments, the network management server is located outside the network to be managed, at a network management service provider's site. The communication between the management server and the network elements to be managed is carried out over the Internet. To this end, network management commands are sent to the user via the Internet through the firewall in an encapsulated form. They are decapsulated by the applet running in the user's web browser. The applet then initiates the execution of a network management command in the user's network by forwarding it to the respective network element. In turn, the applet then receives result data from the network element in response to the command and forwards it to the network management server over the Internet. As will be explained below in more detail, an encapsulated network-management-protocol request is sent to the user as a web response (i.e. an HTTP response) to a corresponding web request (i.e. HTTP request) originating from the user. Therefore, from the perspective of the firewall, the incoming IP datagrams carrying the network management request are a response to an HTTP request returning to the origin of the request. Such datagrams can normally pass the firewall.

In order to carry out network management steps, the applet needs to open files in order to read them and, optionally, write into them. (Actually, the applet needs to establish network connections to network elements; however, this is abstracted in UNIX to the opening of a file). In order to avoid the risk that an applet might do some kind of damage to a web visitor (for example, an applet could infect the visitor's host with a software virus), an applet is normally only authorized to establish a connection to its server over the Internet. In the preferred embodiments, the applet is therefore privileged so that it can establish the required network connections. The privilege can be achieved by signing the applet. The signature tells the user where the applet comes from. In order to authorize the applet for the required file access, the user has to accept the signed applet, either individually or generally. (see, for example, Horstmann, page 142).

In the preferred embodiments, the applet mainly functions as a translator between web traffic and network-management protocol commands and messages. Preferably, the applet has no "knowledge" about the user's network, and no knowledge about the rules applied at the service provider's site, either. This has the advantage that the size of the applet's code can be kept relatively small, so that it can be easily loaded over the Internet. Different versions of the applet may be provided, for example versions depending on the actual network-management protocol to be used. For example, there may be different applet versions for SNMP and Telnet commands.

In the preferred embodiments, data is transmitted over the Internet in an encrypted form, for example using HTTPS, in order to ensure that passwords and other sensitive data (such as host names) are kept secret. It is also possible to store such secret data momentarily in the user's browser rather than transmitting them. In this case, however, the applet combines the network-management protocol command received from the service provider (then without this data) with the stored data before executing the command.

In the preferred embodiments, a network management service is performed in the framework of a session made up of HTTP requests and responses (Unless otherwise specified, "HTTP" is used in a broad sense in this description, which includes HTTPS and other similar protocols enabling web traffic). In HTTP the individual requests/responses are not related to one another. HTTP is therefore also called a stateless protocol. Due to HTTP's stateless nature, session management is carried out by the service provider. The individual HTTP requests/responses which together form a network management session are bound together under the control of the session management, for example by including a unique session identifier to each HTTP response belonging to a particular session in such a manner that the session identifier is returned by the user's web browser with the next request to the service provider. The session identifier can be included in a cookie, a URL or a hidden field in an HTML document sent to the user. It should be noted that, in the preferred embodiments, the number of turns (i.e. request-response pairs) may be not fixed since it may depend on the contents of a management response received during the management session under consideration. For example, it may depend on a management response received in the session whether and what further network information is required.

In the preferred embodiments, a network management session proceeds in the following way: First, the user who wishes to obtain a network management service enters a start page of the service provider (in technical terms, the user sends an HTTP GET request with a request-URI (Uniform Resource Identifier) pointing to a start document of the service provider, whereupon the service provider returns the start document identified by the request-URI to the user; the start document is then displayed in the user's web browser, thus forming the "start page"). A session identifier indicative of the particular session now started is included in the start page.

By actuating (clicking on) a hyperlink in the start page, the user sends another HTTP GET request to the service provider with which he confirms the request for a network management service. Optionally, a user authentication may be required at that stage to provide advanced personalized services. Then, the user has to enter authentication data (e.g. name and password) and send an HTTP POST request together with the authentication data). In the preferred embodiments, the service provider then returns an HTTP response in the form of an analyzer selection page.

The analyzer selection page enables the user to pre-select one of several analyzers to be used in the subsequent service management carried out by the service provider. For example, the user may pre-select an analyzer which uses a certain management protocol (e.g. SNMP or Telnet) and works only on certain network elements (for example, on CISCO routers and switches). Such an analyzer pre-selection is advantageous (but not necessary) since it enables the applet which will be transferred to the user to be kept small. After having selected a certain analyzer in the analyzer selection page, the user sends the analyzer selection information with a further HTTP request to the service provider by activating a hyperlink in the analyzer selection page.

In the preferred embodiments, as a next step, the service provider returns an analyzer initialization page as an HTTP response. The analyzer initialization page displayed in the user's browser enables the user to specify the network device or devices which shall be subjected to the network management and to enter network-specific authentication information (e.g. a device password) which is required to perform the network management with the specified device(s). The user then sends this authentication data to the service provider together with another HTTP request by activating a corresponding hyperlink in the analyzer initialization page. By sending this HTTP request, the user actually starts the network management process. It is likewise possible that the network-specific authentication data is stored at the user's site rather than being transmitted over the Internet, and is combined with the next response from the service provider (the authentication is then only performed after the applet has been started).

Thereupon, the service provider returns, as an HTTP response, an applet page in which the code of the applet or a link to a location is included from where the applet code is to be fetched. When the applet page is loaded in the user's browser, the applet is started (i.e. initialized). In the preferred embodiments, the following network management steps are performed automatically under the control of an application for carrying out the network management service at the service provider's side, without intervention by the user. This application is also called "the analyzer".

In alternative embodiments, the applet is not transferred each time the user loads the applet page. Rather, the applet (or several versions of applets) can be stored at the user's side when the user loads the applet page for the first time. When the user then again loads the applet page, the already stored applet can be loaded in the user's browser.

Depending on the particular web browser used, the user may then be required to expressly authorize the applet to open files (i.e. network connections) at the user's side.

In some of the preferred embodiments, after the applet has been started, it sends an HTTP request to the service provider indicating that it is waiting for a network management request from the service provider. In alternative preferred embodiments, a network management request can be already contained in the applet page in the form of parameters; the applet then immediately carries out the first network management step. In the more preferred embodiments in which the applet is waiting, the analyzer returns an HTTP response containing an XML-encoded network management request. The applet decapsulates or unpacks the network-management-protocol request and sends it to the network device of the user's network, as specified in the request. Then, the applet waits for a response to the network-management-protocol-command from the network device. Upon receipt, the applet encapsulates or packs the response to the network-management-protocol-command from the network device in an XML-encoded network management response and sends it to the analyzer with an HTTP POST request. Then, the applet waits for a further network management request or an end-of execution instruction from the analyzer.

The service provider's analyzer analyzes the network management response received from the user. The analyzer then returns an HTTP response which either includes a further network management request (whereupon the above-described operation of the applet is started again) or an end-of-execution instruction, if the network management procedure should be terminated. In this case, the analyzer also prepares a report about the results of the network management procedure which has been carried out. The report or a link to a report page is included in the HTTP response which contains the end-of-execution instruction. If the response includes a link to the report page, the applet sends a corresponding HTTP request to get the actual content of the report. Finally, the applet displays the report in the user's browser, and then terminates. In the disclosed embodiments, this is the end of the network management session.

In the preferred embodiments, the network protocol commands sent to the network devices by the applet and their response received by the applet are displayed in the applet window of the user's browser so that the user can monitor all network management activities.

Although it is generally preferred that the network management requests are generated automatically by the analyzer, and also the analysis and report generation is performed automatically by the analyzer at the provider's side, it is likewise possible for a human operator to define the network management requests at the service provider's side (and thereby to effectively log into the user's network remotely) and/or analyzes the results and prepares the final report. The network management requests defined by a human operator are encapsulated in the same manner as the above-described automatically generated requests. The manual intervention is transparent for the user, therefore no change is required at the user's side to enable it.

In the preferred embodiments, the analyzer is grouped in two different functional parts, an application logic part and a presentation part. The two parts may be physically assigned to different hosts or only logically to different tasks. In the most preferred embodiments, the application logic part is assigned to an application host, and the presentation part to a presentation host which is the or one of the service provider's web servers. The representation part can be realized by any software system which can actively generate web pages, such as a servlet (using Java Server Pages by SUN MICROSYSTEMS) or a corresponding Active Server Pages Program (MICROSOFT). The application logic part on the application host is responsible for the generation of the network management requests and the analysis of the network management results. On the other hand, the presentation part (the servlet) transforms a network management request received from the application logic part in a concrete request with regard to the particular network device to be addressed and the particular network-management-protocol to be used. The network management results received by the servlet are, in turn, translated in a protocol-independent representation and forwarded to the application logic part. Thus, in the preferred embodiments, the communication between the application logic part and the presentation part is carried out on a more abstract level than the communication between the presentation part and the user's applet over the Internet. Preferably, the data exchange between the application logic part and the presentation part is also based on XML. However, due to the different levels of abstraction, the two communication "layers" use different XML Document Type Definitions (DTDs) or XML Schemas.

Returning now to FIG. 1, it shows a high-level architecture diagram of a system for providing a network management service over the Internet. The system can be subdivided into three parts: (i) a service provider computer system 1; (ii) a user's network 2; and (iii) the Internet 3.

Traffic between the user's network 2 and the Internet 3 passes through a gateway computer 4 which forms part of the user's network 2. A firewall gateway 5 is interposed between the gateway computer 4 and the Internet 3. As a prerequisite, a web client program, called browser 6, has to be installed (which is the case with all current operating systems) and started on the gateway computer 4. Upon loading a network-management-service applet page in the web browser 6, an applet 7 is run in the browser 6. Assigned to the applet 7 is an applet window 8 displayed in the graphical user interface of the web browser 6.

The gateway computer 4 is networked with all network devices 9a, 9b of the user's network 2, or at least with all network devices which have access to the Internet 3. Commands and messages of a network management protocol (such as SNMP, Telnet, DMI, WBEM) can be transmitted within the user's network from the gateway computer 4 to the network devices 9a, 9b, and vice versa. The firewall 5 may be configured such that it discards all incoming IP datagrams apart from such IP datagrams representing HTTP responses which can be assigned to previous HTTP requests sent from the user's network 2 into the Internet 3. Therefore, management-protocol commands directed from the Internet 3 into the user's network 2 would be discarded by the firewall 5.

The service provider system 1 comprises a web server host 10 and an application logic host 11. A web server program called "web server" 12 is installed on the web server host 10. The web server 12 receives HTTP requests from users 14 from the Internet 3 and returns corresponding responses to the respective users via the Internet 3. An analyzer application, called "analyzer" 13 has two parts and is shared between the application logic host 11 and the web server host 10: An application logic part 14 is installed on the application logic host 11, and a presentation part 15 which runs as a servlet, implemented by Java Server Pages, within the web server 12 on the web server host 10. The application logic part 14 is responsible for the generation of network management requests and the analysis of network management results. It is implemented as a Java program, although any other (preferably object-oriented) suitable programming language can be used. The communication between the application logic part 14 and the servlet 15 will be explained in detail below. A user interface 16 enables an operator to communicate with the application logic part 14 if network management steps are to be carried out manually or any other manual intervention is required.

It should be noted that no special network management software has to be installed nor any special network management devices are required in the user's network 2 for the network management. The only dedicated software required is the applet 7 running within the standard web browser 6. This applet, however, does not need not to be stored persistently within the user's network 2, but can be loaded via the Internet 3 each time the corresponding applet page is accessed by the user.

Figure 2:
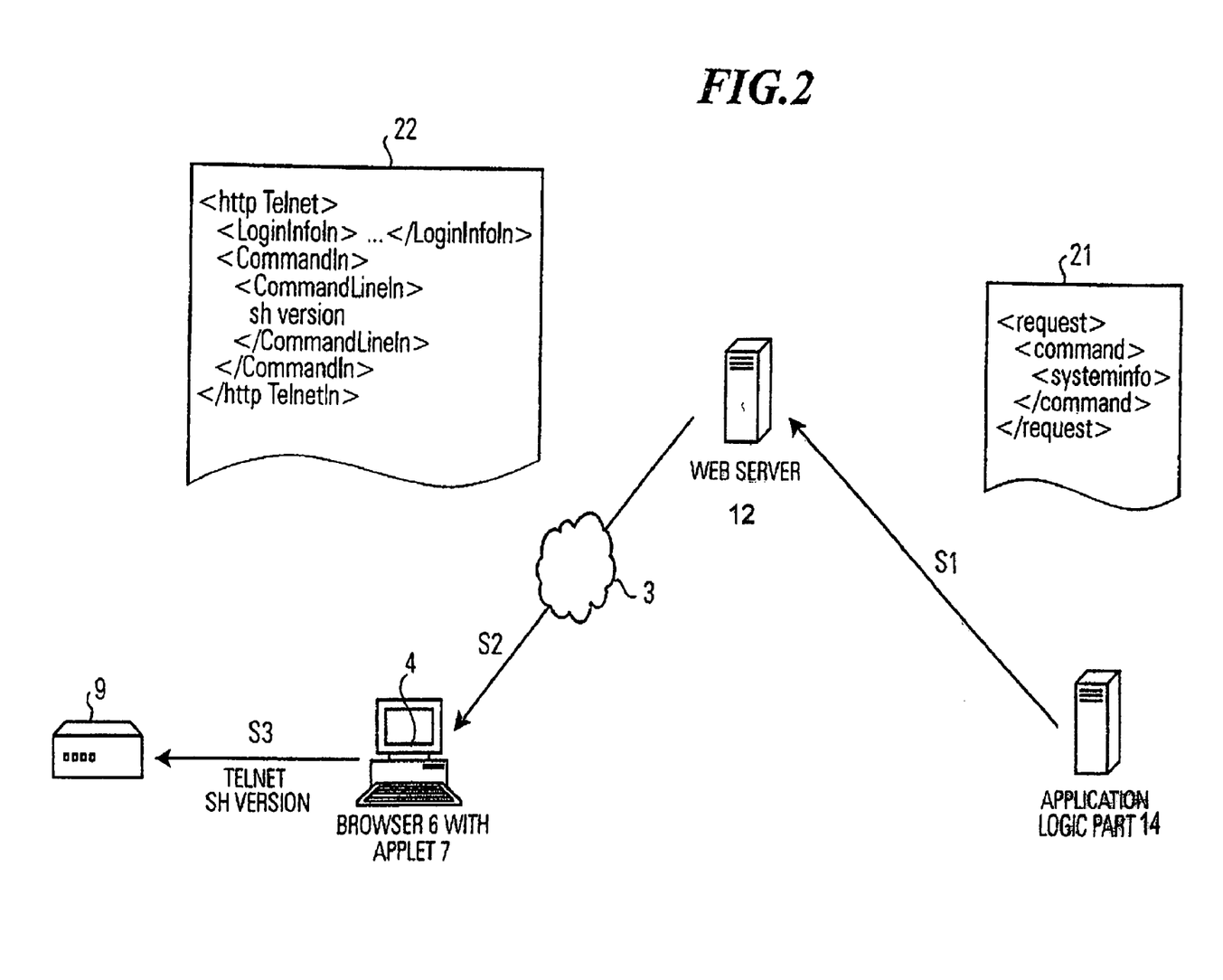
FIG. 2 illustrates a first part of the processing of an exemplary network management request using the Telnet protocol.
Figure 3:
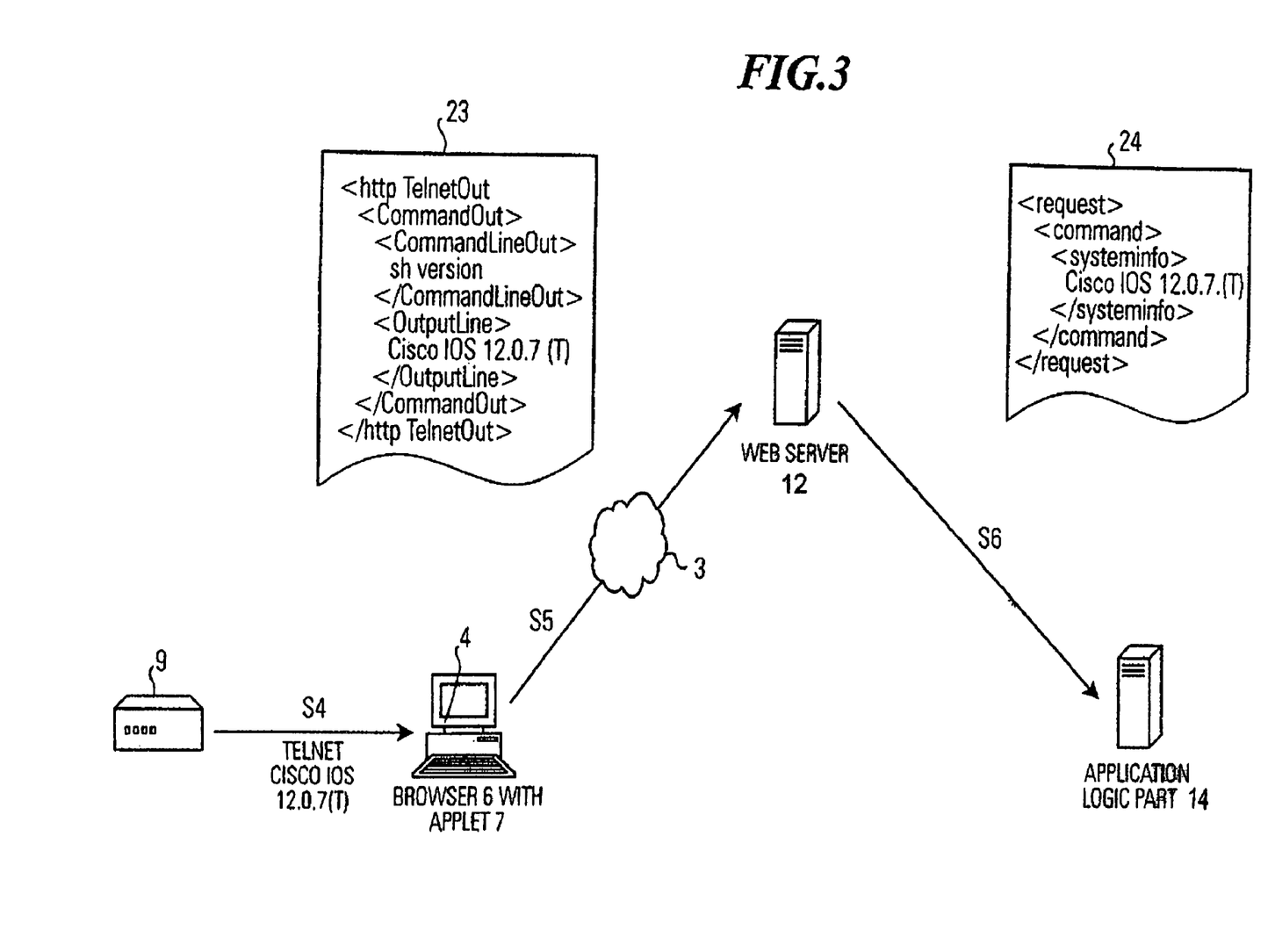
FIG. 3 illustrates the second part of the processing of the network management request of FIG. 2.

FIGS. 2 and 3 illustrate the processing of an exemplary network management request using the Telnet protocol. In a first step S1, the application logic part 14 generates a network management request and forwards it to the servlet 15 in the form of an XML document, called abstract request document 21. In XML, every start tag, such as <request>, must have a corresponding end tag, such as </request>. Otherwise, a tag must be an empty tag, a tag that has an explicit slash at the end of it, as in <systeminfo/>. In the disclosed embodiments, the start and end tags are used to indicate "metacontent". Metacontent is information about the contents bracketed between a start and an end tag. For example, the <request> tag indicates that the contents between its start and end tags is a network management request. Likewise, the <command> tag indicates that the content between its start and end tags is a network management command. In contrast, empty tags provide content rather than metacontent. For example, the <systeminfo> tag indicates itself that the network management command to be carried out is "systeminfo". The systeminfo command is a command by which a network device shall return its system information. The XML document 21 is a logical (or abstract) representation of the systeminfo management command, since it does not specify concrete details required for the actual execution of the command (this will become clear in the next step where these details are added). The set of tags which can be used in the abstract communication between the application logic part 14 and the servlet 15 are defined in an XML DTD or Schema, which is called here an abstract DTD or Schema.

In step S2, the servlet 15 receives the abstract XML request 21 and trans-forms it in a different, more concrete XML representation, which is called concrete XML document 22. In this transformation process, on the one hand, content is added and, on the other hand, content received from the application logic part 14 is transformed. The added content is, for example, information regarding the management protocol to be used (here: Telnet, indicated by the <http Tel-netIn> tag as well as network-device-specific information, indicated by the <LoginInfoIn> tag. The translated content is here the logical systeminfo command which is translated in the corresponding Telnet command "sh version". The XML DTD or Schema on which the concrete XML request is based, called concrete XML DTD or Schema, is different from the abstract DTD or Schema. On the one hand, it comprises additional metacontent tags, for example the above-mentioned tags indicating protocol-related and device-related contents. On the other hand, tags with the same meaning preferably have a different representation in the two DTDs or Schemas. For example, the <command> tag of the abstract DTD corresponds to the <CommandIn> tag of the concrete DTD. Furthermore, empty tags of the abstract DTD may be transformed in a pair of start and end tags for bracketing specific contents in the concrete representation. For example, the <systeminfo/> tag of the abstract XML document 21 is transformed in the sh version content bracketed between the <CommandLineIn> start and end tags. The concrete XML document 22 is then sent as an HTTP response to the user's gateway computer 4 via the Internet 3.

In step S3 the received HTTP response is processed in the user's gateway computer 4 by the web browser 6 with the applet 7 which functions as a network management gateway. The applet 7 "translates" the received concrete XML management request 22 into a corresponding network-management-protocol command and forwards it within the user's network 2 to the network device 9 indicated in the XML management request 22. In the example of FIG. 2, the applet 7 translates the XML management request 22 into the Telnet command "sh version" and forwards it to the indicated network device (not expressly shown in the exemplary XML request 22 of FIG. 2), using the login information indicated by the contents of the <LoginInfoIn> tag of the XML request 22.

In step S4 (FIG. 3) the network device 9 receives the Telnet "sh version" command, executes it and returns the requested version information (in the example of FIG. 3: "CISCO IOS 12.0.7(T)") as a Telnet response to the applet 7 via the user's network 2.

In step S5, the applet 7 translates the device's Telnet response in an XML document, called concrete XML response 23. The concrete XML response 23 corresponds to the original concrete XML request 22 apart from the following: (i) In order to differentiate input from output instead of the < . . . In > start and end tags, < . . . Out> tags are used; (ii) The response received from the network device 9 is added, it is bracketed between output start and end tags, here named <Output-Line>. Then, the applet 7 sends an HTTP POST request with the concrete XML response 23 in the body of the HTTP POST request to the web server 12 over the Internet 3.

In step S6, the servlet 15 (which is part of the web server 12) transforms the concrete XML response 23 into a logical representation of the system information provided by the network device 9, called abstract XML response 24. The abstract XML response 24 corresponds to the abstract XML request 21, apart from a replacement of the original empty tag, which indicated the network management command, by corresponding metacontent start and end tags bracketing the content of the response to the command. In the example of FIG. 3, the empty tag <systeminfo/> has been replaced by <systeminfo> bracketing CISCO 12.0.7 (T). The servlet 15 forwards the abstract XML response 24 to the application logic part 14 running on the application logic host 11. Finally, the application logic part 14 analyzes the abstract XML response 24 and provides the user with a report (not shown in FIG. 3).

Figure 4:
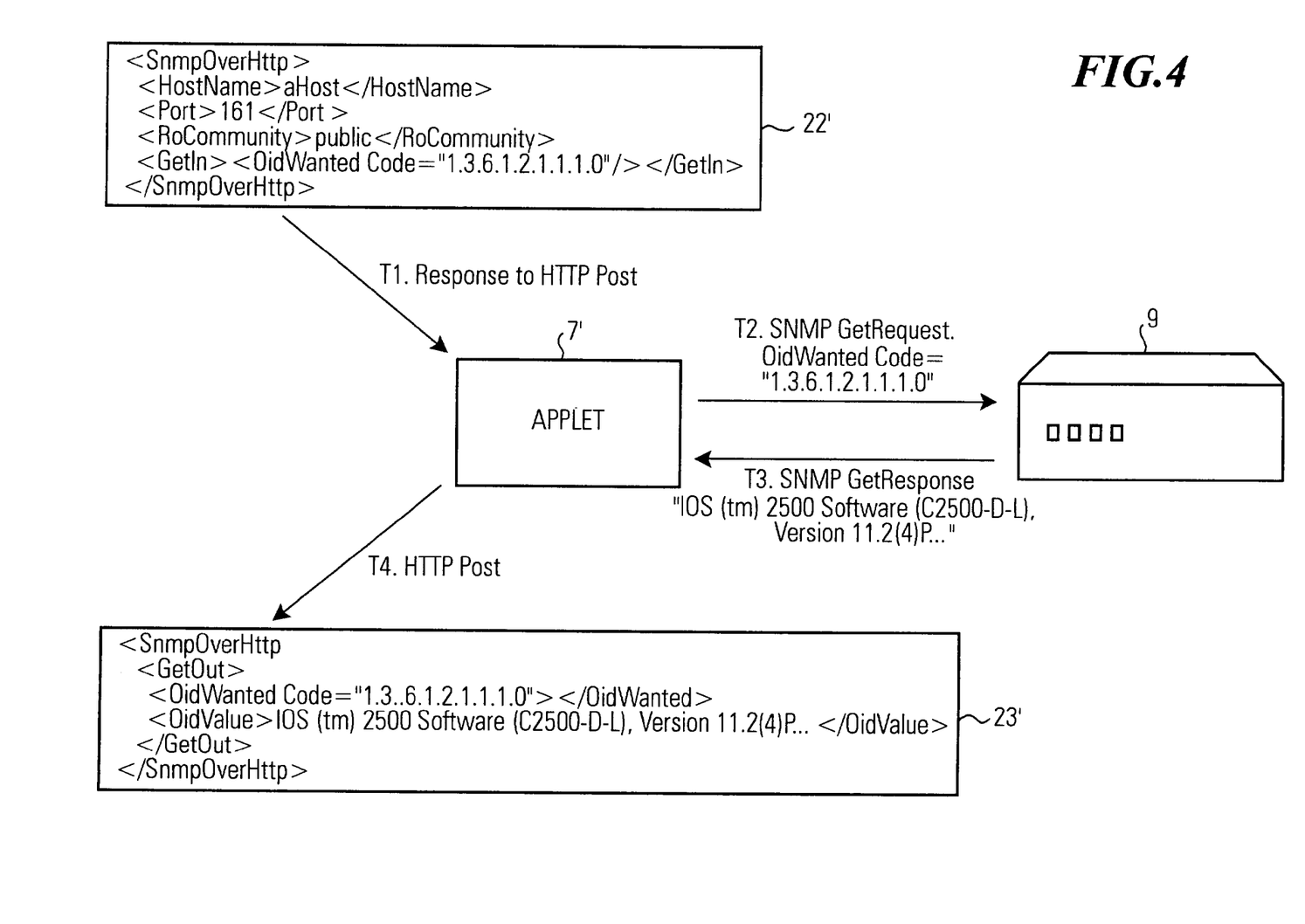
FIG. 4 illustrates the processing of another exemplary network management request using the SNMP protocol.

FIG. 4 illustrates the processing of another exemplary management request based on the SNMP protocol. In FIG. 4 the steps corresponding to steps S1 and S6 of FIGS. 2 and 3 are not shown.

In step T1 (which corresponds to step S2), a concrete XML management request 22' is sent to the applet 7'. In the example of FIG. 4, the concrete XML request 22' indicates that the request is to be carried out using the SNMP protocol. Correspondingly, the tags comprised in the concrete XML request 22' are SNMP-specific, in contrast to the tags of the concrete XML request 22 of FIG. 3 which are Telnet-specific. In particular, the fact that the SNMP protocol shall be used is indicated by the <SnmpOverHttp> tag. The name of the network device and the port number to be addressed as well as the password required to access the network device are bracketed between <HostName>, <Port> and <RoCommunity> start and end tags. The <GetIn> start and end tags indicate that an SNMP GET command shall be carried out with an object identifier (Oid), as specified in the <Oid-Wanted Code= . . . /> tag.

The applets 7, 7' may be management protocol specific, i.e. the applet 7 of FIGS. 2 and 3 may be programmed such that it can only process Telnet-specific requests and responses, whereas the applet 7' of FIG. 4 can be programmed such that it can only process SNMP-specific requests and responses. In alternative embodiments, the applet is programmed such that it can process more than one or even all network management protocols of interest.

In step T2 (which corresponds to step S3) the applet 7' translates the concrete XML request 22' into an SNMP Get request and sends it to the network device 9' indicated in the concrete XML request 22'.

In step T3 (which corresponds to step S4), the network device 9 returns an SNMP Get response reply to the applet 7' including the requested information, indicated by the OID code received with the SNMP Get request.

In step T4 (which corresponds to step S5), the applet 7' translates the SNMP response from the network device 9 in a concrete XML management response 23'. Between an <GetOut> start and end tag the <Oid-Wanted Code . . . > tag is repeated and the returned Oid value is included between <OidValue> start and end tags.

Figure 5:
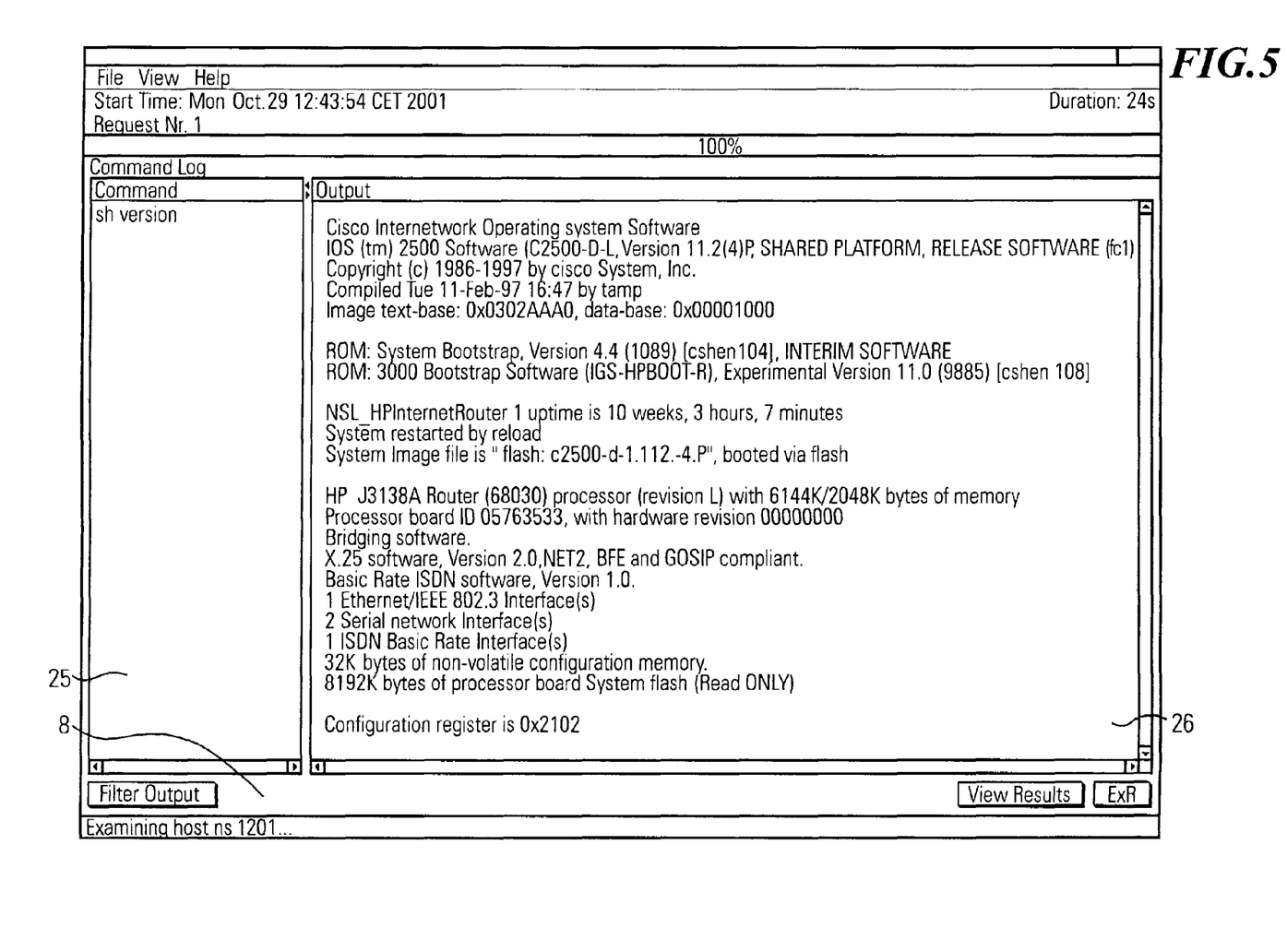
FIG. 5 shows an applet window output generated during the processing of FIG. 4.

FIG. 5 shows an applet window 8 output generated during the processing of FIG. 4. The applet window 8 has two panes, a command pane 25 and an output pane 26. In the command pane 25, the network-management-protocol command sent to the network device 9 is displayed. In the output pane 26 the network-management-protocol-response received from the network device 9 is displayed. The display of the management requests and the corresponding responses takes place in "real time" (i.e. simultaneously) with the processing carried out by the applet 7. It enables the user to monitor the network management activities carried out in the user's network.

Figure 6:
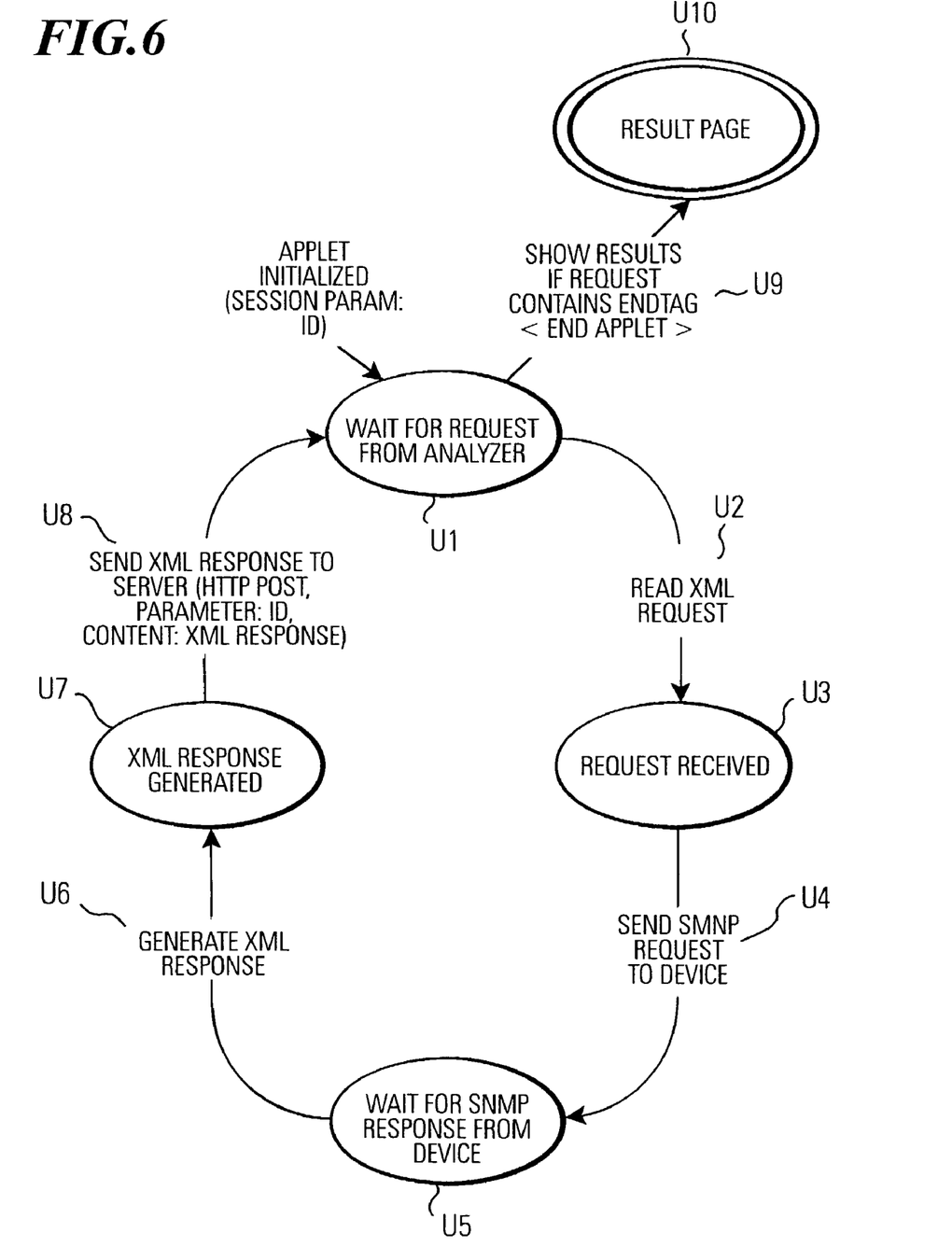
FIG. 6 is a state diagram of an applet.

FIG. 6 is a state diagram of the applet 7. After having been loaded and initialized, the applet 7 waits in state U1 for a network management request from the analyzer 13. When it receives such a request in the form of an HTTP response to a previous HTTP request, together with a session identifier, it reads the concrete XML request 22 in step U2 so as to arrive in a "request received" state U3. Then, in step U4, the applet 7 sends a network-management-protocol request (e.g. an SNMP request) to the network device 9. In state U5, the applet 7 waits for a network-management-protocol response (e.g. SNMP) response from the network device 9. Upon receipt of the response from the device 9, the applet 7 generates in step U6 the concrete XML response 23 so as to arrive in a "XML response generated" state, named U7. Then, in step U8, the applet 7 sends the concrete XML response 23 to the web server 12 as an HTTP POST request. Together with the HTTP POST request, it also returns the session identifier (ID). Then, the applet 8 arrives again in the waiting state U1, where it waits for another request from the analyzer 13.

Depending on the kind of requests received from the analyzer 13, the sequence of states and steps U1 to U8 can be run through only once or repeatedly. If the applet in the waiting state U1 receives another network management request, it again runs through steps U1 to U8 and then again waits in the waiting state U1. If, however, it receives an end-applet tag (e.g. <EndApplet>) in step U9, the applet initiates a result page to be displayed (state U10) and then terminates.

Figure 7:
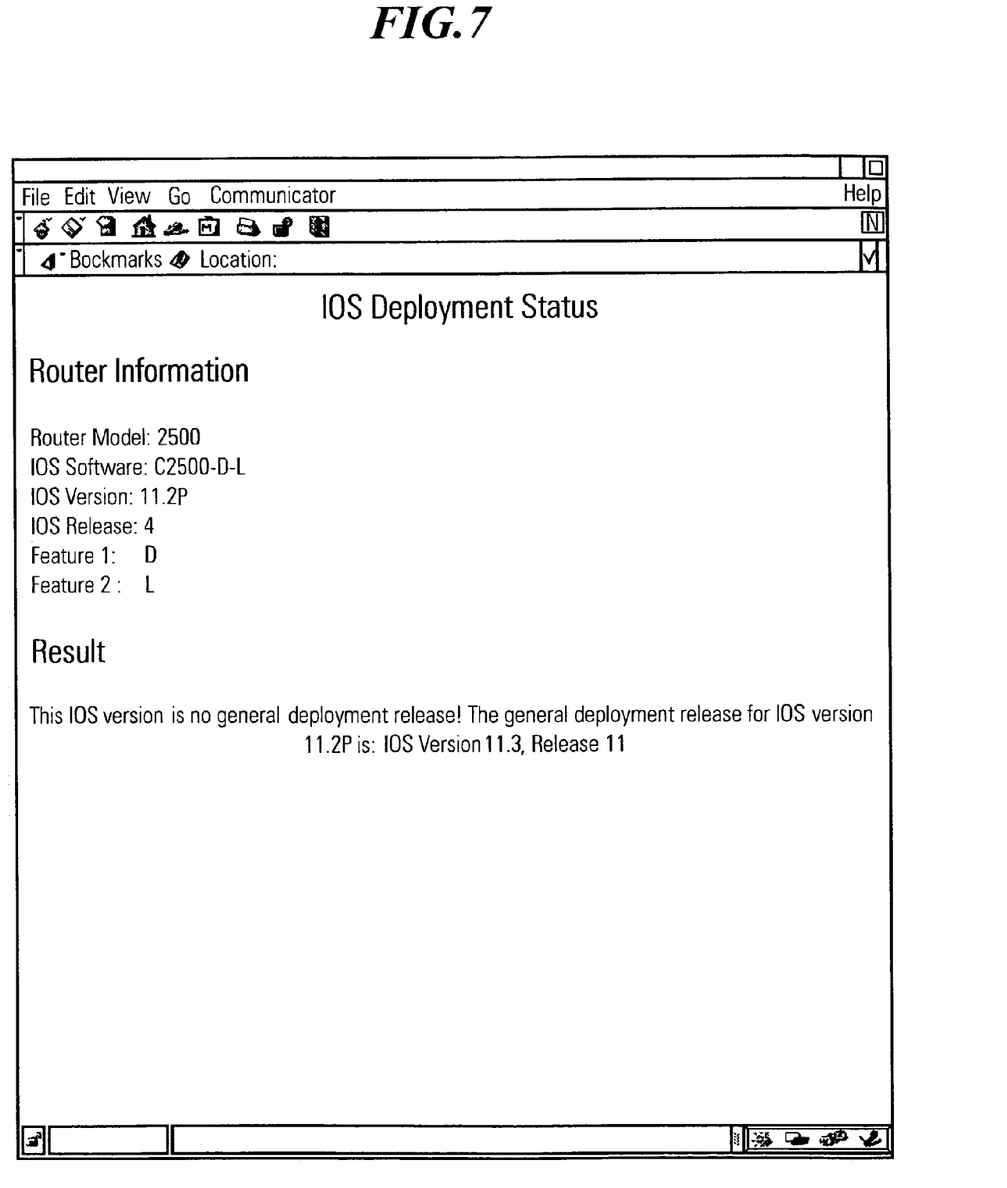
FIG. 7 is an example of a report page received as the result of the network management processing illustrated in FIG. 4.

FIG. 7 shows an example of such a result page displayed in the user's web browser 6 after the network management processing illustrated in FIGS. 4 and 5 has been performed. In this exemplary result page, it is indicated that the IOS version, which has been found in the processing according to the examples of FIGS. 4 and 5 is "no general deployment release", and that the general deployment release version is another version ("IOS Version 11.3, Release 11"). Thus, as a result of this exemplary network management service, it has been found that the user uses a "wrong" IOS version, and the user is informed about that: As a next step, the user could, for example, have the correct IOS version installed.

Figure 8:
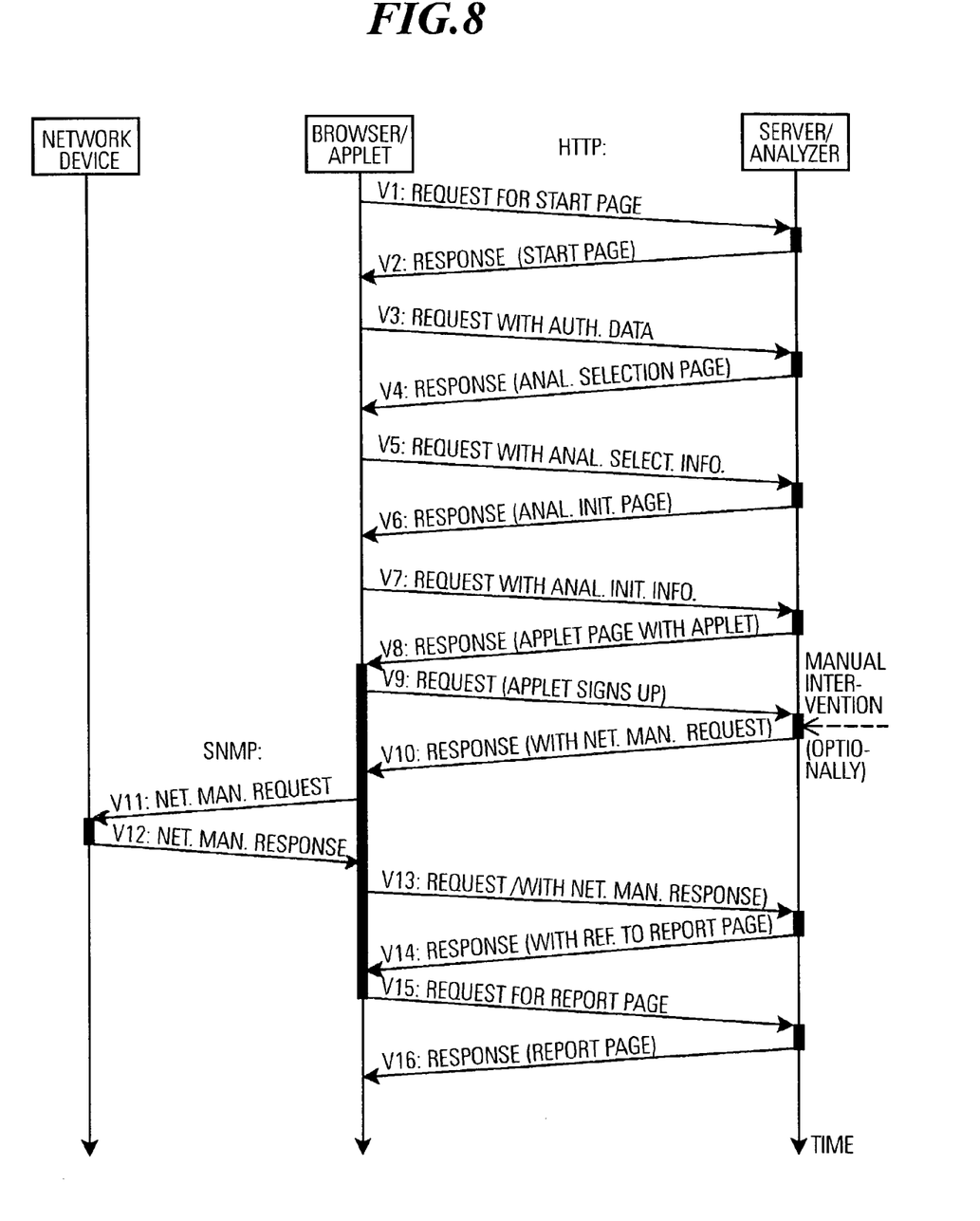
FIG. 8 is a timing diagram of a network-management-service HTTP session.

FIG. 8 is a timing diagram of a network-management-service HTTP session. The provider's server 12 with the analyzer 13, the user's browser 6 with the applet 7 and the user's network device 9 are drafted on the left-hand side, in the middle and on the right-hand side of FIG. 8, respectively. The communication within the analyzer 13, i.e. between the servlet 15 and the application logic part 14 is not represented in FIG. 8 for simplicity.

In step V1 the user sends from his browser 6 an HTTP request for a network-support-service start page to the server 12. Upon receipt of the start page request, the server 12 considers a network-support-service session to be started and assigns a session identifier to this session. In step V2, the server 12 returns the start page as an HTTP response to the user's browser 6. The session identifier is included in this and all subsequent HTT responses sent to the user and all HTTP requests sent from the user to the service provider which enables a session manager within the server 12 to correctly assign all pertinent requests to the present session. The start page is then displayed in the user's browser 6. User authentication for personalized services is optional; FIG. 8 illustrates an embodiment with user authentication. Accordingly, the user then enters authentication data and sends in step V3 an HTTP POST request together with the authentication data to the server 12. In step V4 the server 12 returns an analyzer selection page as an HTTP response which is then displayed in the user's browser 6. The user then selects a specific type of analyzer (e.g. an IOS version analyzer for CISCO devices) and sends, in step V5, the analyzer selection information as an HTTP POST request to the server 12. In step V6 the server 12 sends an analyzer initialization page as an HTTP response to the user which is then displayed in the user's browser 6. The user then enters data specifying what network device is to be subjected to network management and also enters network-specific authentication information (e.g. a required device password). In step V7, the user sends the entered information as an HTTP POST request to the server 12. The analyzer 13 then selects an applet 7 which is appropriate for the selected analyzer type and the specified network devices. The server 12 sends, in step V8, a corresponding applet page as an HTTP response to the user. The applet page contains the code of the applet 7 or a link to an URL from where the code can be loaded. The applet 7 is loaded in the user's browser 6, and the applet is initialized (if necessary, after having been fetched from the location specified by the URL). In step V9, the applet then sends an HTTP request to the server 12 indicating that it has been initialized. Thereupon, the applet enters the waiting state U1 of FIG. 6.

In step V10 the server 12 sends an HTTP response with an encapsulated network management request (for example, the correct XML request 22' of FIG. 4) to the applet 7. Thereupon, the applet 7 runs through the steps and states shown in FIG. 6. First, in step V11, the applet 7 decapsulates the received management request and sends a corresponding network-management-protocol request (in the present example: the SNMP request shown in FIGS. 4 and 5) to the network device 9 within the user's network (steps U2 to U4 in FIG. 6). The applet 7 then enters the waiting state U5 of FIG. 6. The network device 9 then complies with this request by returning in step V12 a network-management-protocol response (here: the SNMP response shown in FIGS. 4 and 5) to the applet 7. The applet 7 translates the network-management-protocol response into an XML response (for example, the concrete XML response 23' of FIG. 4) and sends, in step V13, an HTTP POST request with the XML response to the server 12 (steps U6 to U8 in FIG. 6). The applet 7 then enters the waiting state U1 of FIG. 6. The analyzer 13 analyzes the XML response. If a further network management request has to be carried out, another network management request is prepared and sent to the applet as an HTTP response, so that steps V10 to V13 are executed again. If, however, no further management step is required, the analyzer 13 generates a report page based on the XML response or responses received in the present session. In step V14 the server 12 sends an HTTP response to the applet 7 which includes a reference to the report page which is preferably stored in the server 12 and an "end applet" tag. In step V15 the applet 7 sends a "HTTP GET" request to the referenced location of the report page. In step V16, the requested report page is sent to the user as an HTTP response and the applet displays the report in the user's browser 6. Then the user can terminate the applet by pressing an Exit button. This is the end of the network management HTTP session.

With the preferred embodiments, no additional network-management hardware or costly network management software is required. Therefore, the preferred embodiments are an attractive solution for "low end" network management (i.e. management of small networks). The threshold for network users of seeking professional network support is lower than it was previously the case. Thus, a general purpose of the preferred embodiments is to provide improved methods for providing and contributing to an IT network management service as well as applets therefor.

All publications and existing systems mentioned in this specification are herein incorporated by reference.

Although certain methods and products constructed in accordance with the teachings of the invention have been described herein, the scope of coverage of this patent is not limited thereto. On the contrary, this patent covers all embodiments of the teachings of the invention fairly falling within the scope of the appended claims either literally or under the doctrine of equivalents.

What is claimed is:

1. A method executing on hardware of providing a network management service for a user's IT network by using a network management service provider connected to an Internet, the method performed by the service provider comprising:

sending mobile code to the user via the Internet, said mobile code, when running at a user's side, being such as to cause a computer at the user's side to act as a network management gateway between the user's network and the service provider;

sending at least one request for execution of a network management step to the network management gateway at the user's side via the Internet, the at least one request for the execution of the network management step being such as to cause the network management step to be carried out in the user's network; and receiving, from the network management gateway via the Internet, result data obtained as a result of the network executing the network management step.

2. The method of claim 1, wherein the request for the execution of the network management step is sent to the network management gateway at the user's side as a web response to a corresponding previous web request from the network management gateway.

3. The method of claim 2, wherein the web response includes the request for the execution of the network management step in a form of an encapsulated network-management-protocol command.

4. The method of claim 3, wherein the network management-protocol command is one of a Simple Network Management Protocol, Telnet, Desktop Management Interface and Web Based Enterprise Management command.

5. The method of claim 3, wherein the encapsulated network-management-protocol command is included in an Extensible Markup Language document included in or referenced by the web response.

6. The method of claim 3, wherein the network management gateway is programmed for decapsulating the received network management-protocol command and executing the decapsulated command in the user's IT network.

7. The method of claim 1, wherein the network management gateway is programmed such that, in response to it receiving result data of the execution of the network management step in the user's IT network, the network management gateway sends the result data to the service provider in response to the execution request.

8. The method of claim 7, wherein the result data are analyzed by the service provider and a report comprising results of the analysis is provided to the user.

9. The method of claim 8, wherein the report is provided by a web response comprising a report document or a reference to a report document.

10. The method of claim 7, wherein the result data are sent to the service provider included in a web request.

11. The method of claim 1, wherein the mobile code is an applet for running in a user's web browser.

12. The method of claim 11, wherein, the service provider responds to the user sending a corresponding web request to the service provider by returning a web response including the applet or a reference to the applet to be loaded in the user's web browser.

13. The method of claim 11, wherein, in response to the user sending a corresponding web request to the service provider, the service provider returns to the user a web response which enables the user to either fetch and load the applet but, if the applet is already stored at the user's side, to cause the stored applet to be loaded in the user's web browser.

14. The method of claim 1, wherein an operator carries out at least one network management step in the user's network from the service provider's side by sending at least one request for the execution of a network management step to the network management gateway via the Internet.

15. The method of claim 1, wherein an application for carrying out the network management service at the service provider's side is divided in at least two parts, an application-logic part and a presentation part, wherein the application-logic part controls the provided network management service and the presentation part acts as an interface between the application-logic part and the network management gateway at the user's side.

16. The method of claim 1, wherein all data sent from the user to the service provider or from the service provider to the user passes a firewall gateway between the user's IT network and the Internet.

17. The method of claim 1, in combination with the user's IT network performing the steps of (a) the computer acting as the network management gateway, (b) carrying out the network management step, and (c) sending the result data to the service provider via the Internet.

18. A method of providing a network management service for a user's IT network by a network management service provider hardware, the service being performed over an Internet, the network management service provider hardware performs steps comprising:
sending at least one network management command in an encapsulated form to the user's side over the Internet for decapsulation into a network-management-protocol command at the user's side and execution in the user's IT network; and
receiving result data obtained by executing the network-management-protocol command over the Internet.

19. The method of claim 18, wherein the service provider hardware sends mobile code to the user via the Internet before or simultaneously with the sending of at least one network management command;
said mobile code, when running at the user's side, performs the decapsulation and execution of the network management command and sends the result data to the service provider hardware.

20. The method of claim 19, wherein the mobile code is an applet for running in a user's web browser.

21. The method of claim 20, wherein, in response to the user sending a corresponding web request to the service provider, the service provider returns a web response to be loaded in the user's web browser, the web response including the applet or a reference to the applet.

22. The method of claim 21, wherein, in response to the user sending a corresponding web request to the service provider, the service provider returns a web response which enables the user to either download and execute the applet, but if the applet is already stored at the user's side, to cause the stored applet to be executed in the user's web browser.

23. The method of claim 19, wherein the result data is sent in a web request to the service provider.

24. The method of claim 18, wherein the result data is analyzed by the service provider and a report including results of the analysis is provided to the user.

25. The method of claim 24, wherein the report is provided by a web response including a report document or a reference to a report document.

26. The method of claim 18, wherein the network management command is sent to the user as a web response to a corresponding previous web request from the user.

27. The method of claim 18, wherein the network management-protocol command is one of a Simple Network Management Protocol, Telnet, Desktop Management Interface and Web Based Enterprise Management command.

28. The method of claim 18, wherein the encapsulated network-management-protocol command is included in an Extensible Markup Language document included in or referenced by the web response.

29. The method of claim 18, wherein an operator executes at least one network management step in the user's network from the service provider's side by sending at least one network management command in an encapsulated form to the user's side.

30. The method of claim 18, wherein an application for carrying out the network management service at the service provider's side is divided in at least two parts, an application-logic part and a presentation part, wherein the application-logic part controls the network management service provided and the presentation part acts as an interface between the application-logic part and the user.

31. The method of claim 18, wherein all data sent from the user to the service provider or from the service provider to the user passes a firewall gateway between the user's IT network and the Internet.

32. A method of contributing to a network management service for a user's IT network hardware at a user's side, said management service being provided to the user's IT network hardware by a network management service provider over an Internet, the method performed by the user's IT network hardware comprising:
receiving mobile code via the Internet, said mobile code, when running at the user's side, causing a computer at the user's IT network hardware to act as a network management gateway between the user's network and the service provider;

receiving, via the Internet, at least one request for a network management step from the service provider and executing the request by the network management gateway; and returning, to the service provider via the Internet, result data obtained as a result of the network management step.

33. A storage device storing an applet including program code, which when executed by a computer and in a user's Internet browser, acts as a network management gateway between a user's network and a network-management service provider;

said applet, being arranged to respond to receipt of a request for a network management step from the service provider via an Internet by (a) executing the request in the user's network and (b) returning result data obtained in the execution of the network management step to the service provider via the Internet.

34. A method of contributing to a network management service for a user's IT network system at a user's side, said management service being provided by a network management service provider over an Internet, the method performed by a user's IT network hardware comprising:

receiving at least one network management command in an encapsulated form from the service provider over the Internet;

decapsulating the command and thereby obtaining a corresponding network management-protocol command;

executing the network-management-protocol command in the user's IT network hardware; and returning, to the service provider over the Internet, result data obtained by executing the network-management-protocol command.

35. A storage device storing an applet including program code, which, when executed by a computer and in a user's Internet browser, causes the browser to perform a method of contributing to a network management service for a user's IT network, said management service being provided by a network management service provider over an Internet, the applet causing the user's Internet browser to perform steps including:

receiving at least one network management command in an encapsulated form from the service provider over the Internet;

decapsulating the network management command received in an encapsulated form from the service provider over the Internet and thereby obtain a corresponding network-management-protocol command;

executing the network-management-protocol command in the user's IT network; and returning result data obtained by executing the network-management-protocol command to the service provider over the Internet.

36. A computer-readable storage medium comprising a set of instructions comprising a network manager arranged to:

send mobile code to a user via an Internet, wherein the mobile code, when executed at a user's side, is such as to cause a computer at the user's side to act as a network management gateway between the user's network and the service provider;

send at least one request for execution of a network management step to the network management gateway at the user's side via the Internet, the at least one request for the execution of the network management step being such as to cause the network management step to be carried out in the user's network; and receive, from the network management gateway via the Internet, result data obtained as a result of the network management gateway executing the network management step.

37. A user's IT network comprising a computer in communication with a network management service provider over an Internet and the computer arranged to:

receive mobile code via the Internet, said mobile code, when executing at the computer, causing the computer to act as a network management gateway between the user's IT network and the service provider;

receive, via the Internet, at least one request for a network management step from the service provider and executing the request by the network management gateway; and return, to the service provider via the Internet, result data obtained as a result of the network management step executed by the network management gateway.

38. A system for connection to an Internet, the system comprising a set of instructions comprising a network manager arranged to send mobile code to a user via an Internet, wherein the mobile code, when executed at a user's side by computer hardware, is such as to cause the computer hardware at the user's side to act as a network management gateway between the user's network and the service provider;

send at least one request for execution of a network management step to the network management gateway at the user's side via the Internet, the at least one request for the execution of the network management step being such as to cause the network management step to be carried out in the user's network; and receive, from the network management gateway via the Internet, result data obtained as a result of the network management gateway executing the network management step, and a user's IT network comprising a computer in communication with a network management service provider over an Internet and the computer hardware arranged to:

receive mobile code via the Internet, said mobile code, when executing at the computer hardware, causing the computer hardware to act as a network management gateway between the user's IT network and the service provider;

receive, via the Internet, at least one request for a network management step from the service provider and executing the request by the network management gateway; and return, to the service provider via the Internet, result data obtained as a result of the network management step executed by the network management gateway.

39. A method executing on hardware of controlling a user's IT network from a network management service provider, the network and service provider communicating with each other via an Internet, the IT network including a browser with an applet or a capability of receiving an applet, the applet being capable of being loaded with management requests by the service provider via the Internet, the service provider including a generator of the management requests and an analyzer of management results sent via the Internet to the service provider by the IT network, the method comprising:

(v1) a user at the IT network, sending via the Internet to the service provider, a request for a network-support service start page;

(v2) the service provider responding to the request for the network-support service page, by sending, via the Internet to the IT network, the requested start page, the start page including a session identifier that is sent in all subsequent communications during the particular session between the service provider and the IT network;

(v3) the user responding to receipt of the start page by sending, via the Internet to the service provider, a request for a service;

(v4) the service provider responding to the request of (v3) by sending, via the Internet to the IT network, an analyzer selection page;

(v5) the IT network responding to receipt of the analyzer selection page by sending, via the Internet to the service provider, analyzer selection information;

(v6) the service provider responding to the receipt of the analyzer selection information by sending via the Internet to IT network, an analyzer initialization page;

(v7) the IT network responding to receipt of the analyzer initialization page by sending, via the Internet to the service provider, an indication of a specified device of the IT network to be subjected to management by the service provider;

(v8) the service provider responding to receipt of the indication of the specified device by selecting an applet which is appropriate to the specified device and the analyzer selection information specified in step (v5), and by sending, via the Internet to the IT network, an applet page with code or a link to a URL including the code corresponding to the selected and appropriate applet;

(v9) the IT network responding to receipt of the selected and appropriate applet by loading the selected and appropriate applet in the browser and sending, via the Internet the service provider an indication that the applet has been initialized, (v10) the service provider responding to the indication that the applet has been initialized by sending, via the Internet to the applet, a network management request;

(v11) the applet responding to receipt of the network management request of step (v10) by sending a corresponding network-management-protocol request to the specified device;

(v12) the specified device responding to the network-management-protocol request of step (v11) by sending to the applet a network-management-protocol response;

(v13) the applet responding to receipt of the network-management-protocol response by (a) translating the network-management-protocol response into a response that can be transmitted to the service provider via the Internet and (b) transmitting, via the Internet to the service provider, the translated network-management-protocol response receipt of the translated network-management-protocol response;

(v14) the service provider responding to receipt of the translated network management-protocol response by supplying the received, translated network management-protocol response to the analyzer in accordance with the analyzer selection information specified in step (v5), the analyzer responding to receipt of the received, translated network-management-protocol response by analyzing the received, translated network-management-protocol response and by generating a report page based on the analysis of the received translated network-management-protocol response, the service provider sending, via the Internet to the applet, the report page based on the analysis of the received, translated network-management-protocol response.

40. A method executing on hardware of controlling a user's IT network from a network management service provider, the network and service provider communicating with each other via an Internet, the IT network including a browser with an applet or the capability of receiving an applet, the applet being capable of being loaded with management requests by the service provider via the Internet, the service provider including a generator of the management requests and an analyzer of management results sent via the Internet to the service provider by the IT network, the method comprising:

(a) the user sending, via the Internet to the service provider, a request for a service;

(b) the service provider responding to the request of (a) by sending, via the Internet to the IT network, an analyzer selection page;

(c) the IT network responding to receipt of the analyzer selection page by sending, via the Internet to the service provider, analyzer selection information;

(d) the service provider responding to receipt of the analyzer selection information by sending, via the Internet, to the IT network an analyzer initialization page;

(e) the IT network sending, via the Internet to the service provider, an indication of a specified device of the IT network to be subjected to management by the service provider;

(f) the service provider responding to receipt of the indication of the specified device by selecting an applet which is appropriate to the specified device and the analyzer selection information specified in step (c), and by sending, via the Internet to the IT network, an applet page with code, or a link to a URL including code corresponding to the selected and appropriate applet;

(g) the IT network responding to receipt of the selected and appropriate applet by loading the selected and appropriate applet in the browser and sending, via the Internet to the service provider, an indication that the applet has been initialized;

(h) the service provider responding to the indication that the applet has been initialized by sending, via the Internet to the applet, a network management request;

(i) the applet responding to receipt of the network management request of step (h) by sending a corresponding network-management-protocol request to the specified device;

(j) the specified device responding to the network-management-protocol request of step (i) by complying with the network-management-protocol request and by sending to the applet a network-management-protocol response;

(k) the applet responding to receipt of the network-management-protocol response by sending, via the Internet to the service provider, an indication of the network-management-protocol response;

(l) the service provider responding to the receipt of the indication of the network-management-protocol response by supplying the indication of the network management-protocol response to the analyzer in accordance with analyzer selection information specified in step (c), the analyzer responding to receipt of the indication of the network-management-protocol response by analyzing the indication of the network management-protocol response and generating a report page based on the analysis of the received, indication of the network-management-protocol response, the service provider sending, via the Internet to the applet, the report page based on the analysis of the indication of the network-management-protocol response.

* * * * *